United States Patent
Ryu et al.

(10) Patent No.: US 11,134,045 B2
(45) Date of Patent: Sep. 28, 2021

(54) MESSAGE SORTING SYSTEM, MESSAGE SORTING METHOD, AND PROGRAM

(71) Applicant: SONY INTERACTIVE ENTERTAINMENT INC., Tokyo (JP)

(72) Inventors: Mu Ryu, Chiba (JP); Takanori Shimizu, Tokyo (JP)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 196 days.

(21) Appl. No.: 15/684,914

(22) Filed: Aug. 23, 2017

(65) Prior Publication Data

US 2018/0063056 A1 Mar. 1, 2018

(30) Foreign Application Priority Data

Aug. 30, 2016 (JP) .............................. JP2016-167781

(51) Int. Cl.
*H04L 12/58* (2006.01)
*G06N 20/00* (2019.01)

(52) U.S. Cl.
CPC .............. *H04L 51/12* (2013.01); *G06N 20/00* (2019.01); *H04L 51/32* (2013.01)

(58) Field of Classification Search
CPC ......... H04L 51/12; H04L 51/32; G06N 20/00; G06F 40/20; G06F 40/237; G06F 40/30; G06F 40/40; G06Q 30/0203; G06Q 50/01; G09B 3/00; G09B 3/06; G09B 3/10; G09B 7/00; G09B 7/02; G16H 10/20; H04H 60/33; H04N 21/4756; H04N 21/4758

(Continued)

(56) References Cited

U.S. PATENT DOCUMENTS

2014/0046884 A1 2/2014 Maike et al.
2014/0052684 A1* 2/2014 Liao .................... G06F 40/30
                                                        706/46

(Continued)

FOREIGN PATENT DOCUMENTS

JP 2013-131073 A 7/2013
JP 2014-026614 A 2/2014
JP 2014-035625 A 2/2014

OTHER PUBLICATIONS

Hiroyuki Kurahashi, et al. "Extraction of Movie Popularity Information from Microblogs," the Fourth Data Engineering and Information Management Forum Papers (the 10th Annual Conference, The Database Society of Japan),Data Engineering Research Experts Committee, The Institute of Electronics, Information & Communication Engineers, Jul. 13, 2012, E8-6.

(Continued)

*Primary Examiner* — Chris Parry
*Assistant Examiner* — Weiwei Y Stiltner
(74) *Attorney, Agent, or Firm* — HEA Law PLLC

(57) ABSTRACT

A message sorting systems includes: an extraction block configured to extract some of a plurality of posted messages on the basis of a rule with respect to message posting person, reply destination, or contents; and a sorting block configured to sort the extracted messages through a machine-learning sorting device. A message sorting method includes: extracting some of a plurality of posted messages on the basis of a rule with respect to message posting person, reply destination, or contents; and sorting the extracted messages through a machine-learning sorting device.

10 Claims, 9 Drawing Sheets

(58) Field of Classification Search
USPC .......................................................... 709/206
See application file for complete search history.

(56) References Cited

U.S. PATENT DOCUMENTS

| | | | |
|---|---|---|---|
| 2015/0052129 A1* | 2/2015 | Galvin, Jr. | G06Q 30/0201 707/731 |
| 2015/0088593 A1* | 3/2015 | Raghunathan | H04L 51/32 705/7.27 |
| 2015/0142446 A1* | 5/2015 | Gopinathan | G06Q 40/025 704/270 |
| 2015/0150023 A1* | 5/2015 | Johnson | G06F 9/5027 718/107 |
| 2016/0034562 A1* | 2/2016 | Malcolm-Dacosta | H04L 51/12 707/740 |
| 2016/0080438 A1* | 3/2016 | Liang | G06F 16/9537 715/753 |
| 2016/0196561 A1* | 7/2016 | Iyer | G06Q 10/10 705/304 |
| 2018/0034755 A1* | 2/2018 | Saoji | G06Q 30/0269 |
| 2019/0019094 A1* | 1/2019 | Mengle | G06N 20/00 |

OTHER PUBLICATIONS

Office Action dated Jun. 26, 2018, for corresponding JP Patent Application No. 2016-167781 and English translation thereof.

\* cited by examiner

FIG.2A

| POSTING ID | 0121 |
|---|---|
| POSTING PERSON DATA | aaa111 |
| URL DATA | http://... |
| SOURCE DATA | Twitter |
| TITLE DATA | |
| MESSAGE DATA | "RT AAA game is too bad" I don't think so. |
| POSTING DATE AND TIME DATA | 2016-06-15 14:15:34 |
| CATEGORY DATA | |
| EMOTION DATA | |

FIG.2B

| POSTING ID | 0121 |
|---|---|
| POSTING PERSON DATA | aaa111 |
| URL DATA | http://... |
| SOURCE DATA | Twitter |
| TITLE DATA | |
| MESSAGE DATA | "RT AAA game is too bad" I don't think so. |
| POSTING DATE AND TIME DATA | 2016-06-15 14:15:34 |
| CATEGORY DATA | VOC |
| EMOTION DATA | Positive |

FIG. 3

AAA game — F1 search — B1

Category: ALL  [VOC]  Q&A  PR  ISU  Garbage ← F2

Sentiment: [ALL]  Positive  Negative ← F3

Source: ALL  [Twitter]  [Facebook]  Forum  Blog  Youtube ← F4

Publish Date: From  2016-01-01  To  2016-06-30 ← F5

FIG. 4

S1 → aaa111  from Twitter  2016-06-15 14:15:34 ← S3
"RT AAA game is too bad" I don't think so. ← S4

S1 → bbb222  from Facebook  2016-06-14 20:12:14 ← S3
@ppp123 We enjoyed AAA game so much. ← S4

S1 → ccc333  from Twitter  2016-06-13 19:13:34 ← S3
AAA game is so cool. ← S4

S1 → ddd444  from Facebook  2016-06-12 16:23:12 ← S3
I don't want to try AAA game. ← S4

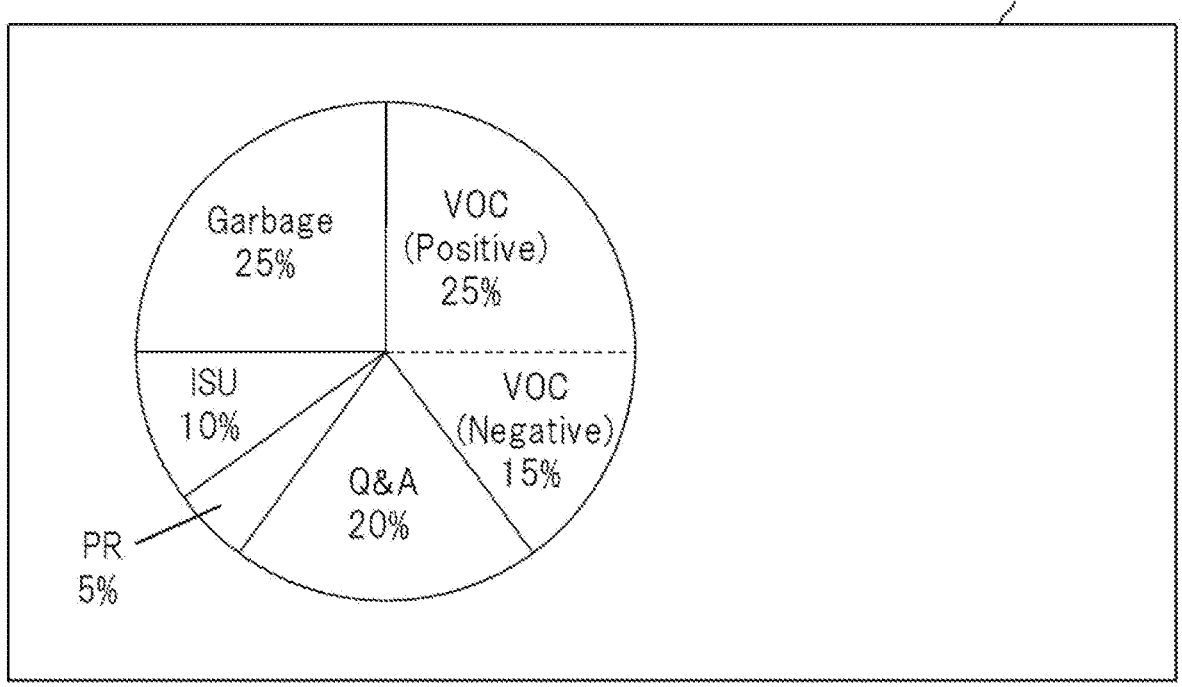

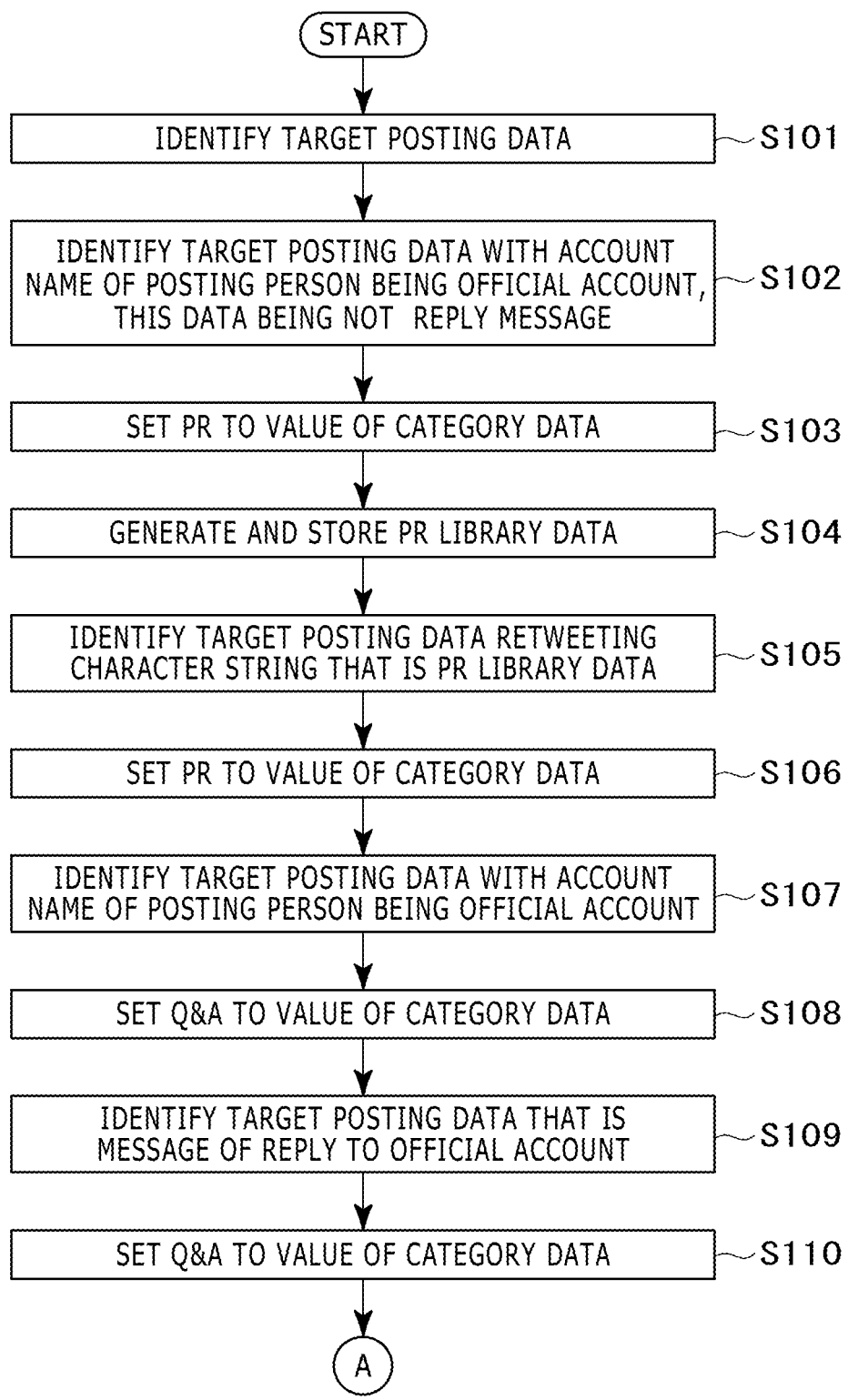

MESSAGE SORTING SYSTEM, MESSAGE SORTING METHOD, AND PROGRAM

BACKGROUND

The present disclosure relates to a message sorting system, a message sorting method, and a program.

It is practiced that messages related with a certain product or service and posted to a social networking service (SMS) such as Twitter (registered trademark) and Facebook (registered trademark) are analyzed. In technologies of this analysis, sorting of messages into a plurality of categories is executed by machine-learning sorting devices. In this case, analyzing the messages for each category enhances the accuracy of analysis of messages.

SUMMARY

If all of the messages subject to analysis are sorted by a machine-learning sorting device, a sufficient message sorting accuracy may not sometimes be achieved. For example, only the message sorting by a machine-learning sorting device may sort messages that do not represent the opinions of posting persons into a message category that represents the opinions of posting persons.

The present disclosure has been made in view of above circumstances, and it is desirable to provide a message sorting system, a message sorting method, and a program that can properly sort posted messages.

According to one embodiment of the present disclosure, there is provided a message sorting system including: an extraction block configured to extract some of a plurality of posted messages on the basis of a rule with respect to message posting person, reply destination, or contents; and a sorting block configured to sort the extracted messages through a machine-learning sorting device.

According to another embodiment of the present disclosure, there is provided a message sorting method including: extracting some of a plurality of posted messages on the basis of a rule with respect to message posting person, reply destination, or contents; and sorting the extracted messages through a machine-learning sorting device.

According to a further embodiment of the present disclosure, there is provided a program for a computer, including: by an extraction block, extracting some of a plurality of posted messages on the basis of a rule with respect to message posting person, reply destination, or contents; and by a sorting block, sorting the extracted messages through a machine-learning sorting device.

BRIEF DESCRIPTION OF THE DRAWINGS

FIG. 2A is a diagram illustrating one example of posting data;

FIG. 2B is a diagram illustrating another example of posting data;

FIG. 3 is a diagram illustrating one example of a search screen;

FIG. 4 is a diagram illustrating one example of a search result screen;

FIG. 5 is a diagram illustrating one example of analysis result screen;

FIG. 6 is a diagram illustrating one example of a success index display screen;

FIG. 9A is a flowchart indicative of one example of a flaw of processing that is executed in the posting analysis system according to one embodiment, of the present disclosure.

DETAILED DESCRIPTION OF THE PREFERRED EMBODIMENT

One embodiment of the present disclosure will be described in detail with reference to the accompanying drawings.

Figure 1:
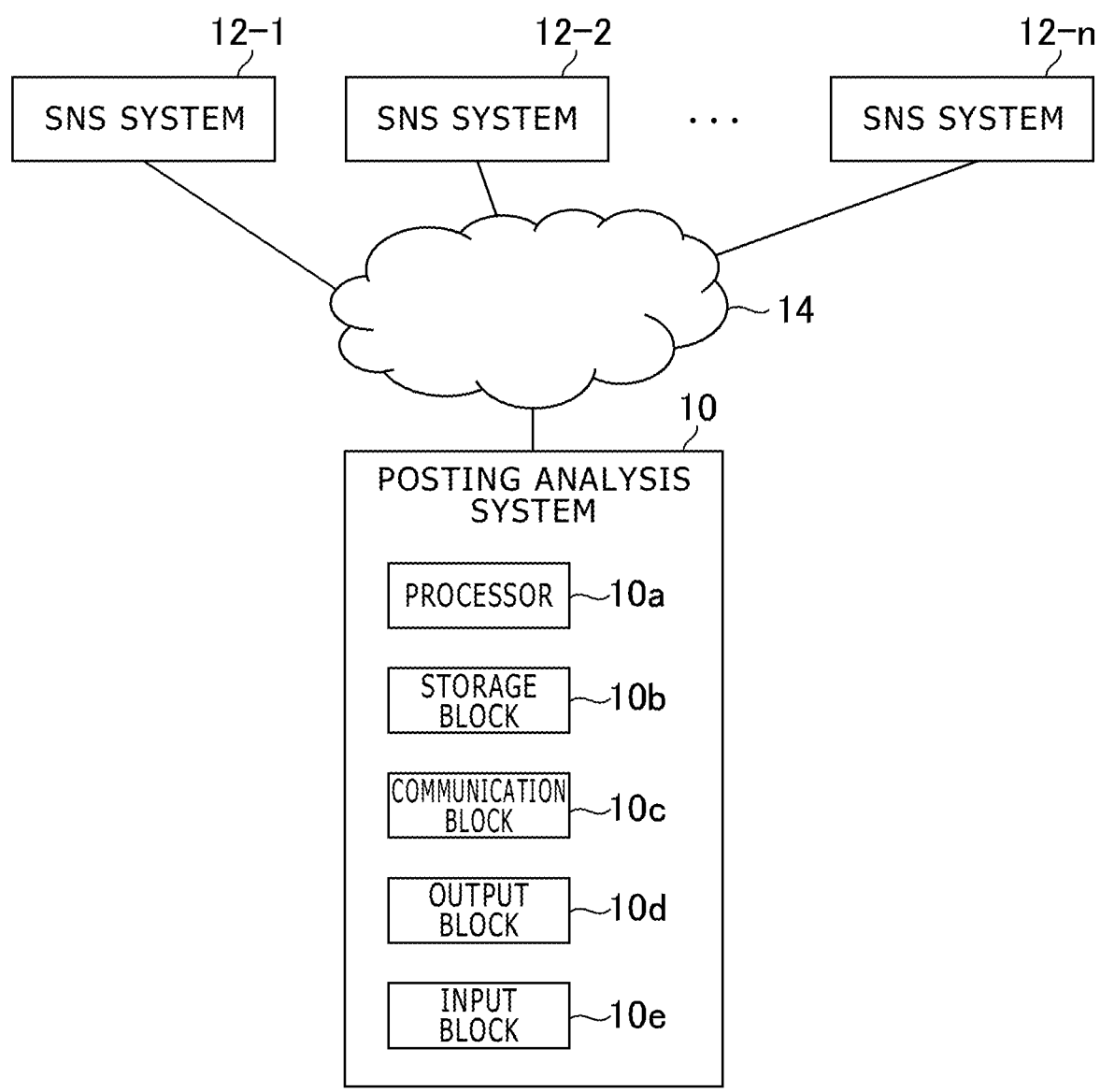
FIG. 1 is a schematic diagram illustrating one example of an overall configuration of a computer network according to one embodiment of the present disclosure.

Now, referring to FIG. 1, there is shown a diagram illustrating one example of an overall configuration of a computer network according to one embodiment of the present disclosure. As shown in FIG. 1, according to the present embodiment, a posting analysis system 10 and a plurality of SMS systems 12 (12-1, 12-2, . . . , and 12-n) are connected to a computer network 14, such as the Internet, for example. The posting analysis system 10 and the SNS systems 12 according to the present embodiment are communicable with each other through the computer network 14.

The SKS system 12 according to the present embodiment is a computer system that provides SNS services, such as Twitter (registered trademark) and Facebook (registered trademark), for example.

The posting analysis system 10 according to the present embodiment is a computer, such as a personal computer, for example.

As shown in FIG. 1, the posting analysis system 10 according to the present embodiment has a processor 10a, a storage block 10b, a communication block 10c, an output block 10d, and an input block 10e, for example. The processor 10a is a program control device, such as a central processing unit (CPU), that operates as instructed by programs installed on the posting analysis system 10, for example. The storage block 10b is a storage device, such as a read only memory (ROM) or a random access memory (RAM), or a hard disk drive, for example. The storage block 10b stores programs and so on that are executed by the processor 10a. The communication block 10c is a communication interface, such as an Ethernet (registered trademark) module or a wireless local area network (LAN) module, for example. The output block 10d is a display block, such as a display, that executes display outputs of information and an audio output block, such as a speaker, that executes an audio output operation, in accordance with an instruction input from the processor 10a, for example. The input block 10e is a mouse, a keyboard, a touch pad, a microphone or the like that outputs the contents of an operation, done by a user to the processor 10a, for example. It should be noted that the posting analysis system 10 may be configured by a single computer or a plurality of computers.

The posting analysis system 10 according to the present embodiment acquires, from each of the SNS systems 12, messages posted to the SNS system 12 concerned. On the basis of an acquired message, the posting analysis system 10 generates posting data related with the message concerned, the posting data being illustrated in FIG. 2A, The generated posting data is stored in the posting analysis system 10.

As shown in FIG. 2A, posting data includes posting identification (ID), posting person data, uniform resource locator (URL) data, source data, title data, message data, posting date and time data, category data, and emotion data.

The posting ID included in posting data is the identification information of posting data, for example. The posting person data included in posting data is the data indicative of the account name of a posting person of a message related with the posting data concerned, for example. The URL data included in posting data is the data indicative of a URL at which a message related with the posting data concerned is viewable, for example. The source data included in posting data is the identification information of the SMS system 12 to which a message related with the posting data concerned was posted, for example. The title data included in posting data is the data indicative of the title of a message related with the posting data concerned, for example. The value of title data may be null. The message data included in posting data is the data indicative of the contents of a message related with the posting data concerned, for example. The posting date and time data included in posting data is the data indicative of the posting date and time of a message related with the posting data concerned, for example.

The category data included in posting data is the data indicative of the category of a message related with the posting data concerned, for example. For the value of category data, any one of Voice Of Customer (VOC), Questions and Answers (Q&A), Public Relations (PR), information shared by User (ISU), and garbage is set, for example. The posting data related with the present embodiment is sorted in any one of these five categories.

Category VOC is set to the posting data that is identified as a message indicative of the opinion of a posting person. Category Q&A is set to the posting data that is identified as a message indicative of a question or an answer. Category PR is set to the posting data that is identified as a message indicative of advertisement. Category ISU is set to the posting data that is identified as a message shared by users. Category Garbage is set to the posting data that is identified as a message to be excluded from browsing or analysis, such as a message that was automatically generated for example.

The emotion data included in posting data is the data indicative of emotions expressed by a message related with the posting data concerned, for example. For the value of emotion data, one of Positive indicative of a positive emotion and Negative indicative of a negative emotion is set. It should be noted that, in the present embodiment, it is assumed that the value of emotion data be set only to the posting data of which category data value is VOC.

With the posting data related with the present embodiment, neither category data value nor emotion data value is set in the initial state after generation as shown in FIG. 2A. In the present embodiment, a category data value and an emotion data value included in posting data are set at predetermined timings as shown in FIG. 2B.

It should be noted that the timings with which a category data value and an emotion data value are set are not especially specified. For example, in response to the generation of posting data, the category data value and the emotion data value of the generated posting data may be set. In addition, for a plurality of pieces of posting data with none of category data value and emotion data value set, category data values and emotion data values may be set in a collective manner.

In the present embodiment, through a search screen 20 illustrated in FIG. 3 that is displayed on the display of the posting analysis system 10, a user is able to execute a search operation on the posting data accumulated in the posting analysis system 10.

In the search screen 20 illustrated in FIG. 3, a plurality of forms (a search character string entry form F1, a category select form F2, an emotion select form F3, a source select form F4, and a posting date and time range setting form F5) for which search conditions can be entered are arranged along with a search button B1.

The user can enter a character string that is a search condition into the search character string entry form F1. In addition, the user can set the value of one or more pieces of category data to the category select form F2. Further, the user can set the value of one or more pieces of emotion data to the emotion select form F3. Still further, the user can set the value of one or more pieces of source data to the source select form F4. Yet further, the user can set the range of the value of pasting date and time data to the posting date and time range setting form F5.

When the user clicks the search button B1 upon entering search conditions in a plurality ox forms, the posting data satisfying the entered search conditions is identified as a search result. Here, for example, the posting data that satisfies all of the conditions (1) through (5) below is identified as a search result; (1) a part or all of a character string indicated by the message data included in the posting data includes the character string entered in the search character string entry form F1; (2) the value of the category data included in the posting data matches any one of the values of the category data set to the category select form F2; (3) the value of the emotion data included in the posting data matches any one of the values of emotion data set to the emotion select form F3; (4) the SNS system 12 identified by the source data included in the posting data matches any one of the SNS systems 12 set to the source select form F4; and (5) the value of the posting date and time data included in the posting data is included in the range of dates and times set to the posting date and time range setting form F5.

Next, a search result screen 22 arranged with search results, as illustrated in FIG. 4, is shown on the display. In the search result screen 22 illustrated in FIG. 4, search result images 24 equivalent to the posting data identified as search results are arranged. Each search result screen 24 includes a character string S1, a character string S2, a character string S3, and a character string S4 related with a value of posting person data, a value of source data, a value of posting date and time data, and a value of message data, respectively, that are included in the posting data that is the search results.

In the present embodiment, setting the search screen 20 allows the selective display of only the contents of a message of the posting data to which a particular category (Category VOC, for example) is set, for example. This allows the efficient browsing of the messages identified as the messages of a particular category.

Further, in the present embodiment, when the user executes a predetermined operation, an analysis result screen 26 illustrated in FIG. 5 is shown on the display. Arranged in the analysis result screen 26 are images indicative of the analysis results of posting data, such as the distribution of categories related with the posting data accumulated in the posting analysis system. 10, for example. FIG. 5 shows the analysis result screen 26 in which images indicative of the ratio of the number of pieces of the posting data related with the categories concerned to the total number of posted messages are arranged. From the analysis result screen 25, the ratio of the number of messages of a certain category to the total number of posted messages can be read, for example. In addition, for the number of pieces of the posting data related with Category VOC, the ratios of the number of pieces of the posting data with the value of emotion data being Positive and the number of pieces of the posting data with the value of emotion data being Negative to the total number of posted messages are also shown.

For example, if the value of emotion data is identified for posting data of PR, then Positive is identified as emotion data value for almost all pieces of the posting data. Therefore, if the ratio of the values of emotion data is analyzed for posting data including the posting data of PR, the number of pieces of posting data with the value of emotion, data being Positive becomes higher than an actual number. Thus, if analysis is executed on all the posting data without sorting the posting data into categories, the analysis results may lack validity. In the present embodiment, posting data, is sorted into five categories and thus analysis can be executed on the posting data sorted into a particular category (Category VOC, for example) thereby providing more accurate message analysis.

It should be noted that what appears on the analysis result screen 26 is not limited to that shown in FIG. 5. For example, for the posting data sorted into Category VOC, the ratio between the number of pieces of posting data with the value of emotion data being Positive and the number of pieces of posting data with the value of emotion data being Negative may be displayed. In addition, for each category, the number of pieces of posting data related with the category concerned may be displayed.

Further, in the present embodiment, when the user executes a predetermined operation, a success index display screen 28 illustrated in FIG. 6 is shown on the display, for example. On the success index display screen 28, for each of a plurality of products or services, a success index indicative of the degree of success for the product or service concerned is shown, for example. For one example of success indexes, FIG. 6 shows the ratio of the number of VOC messages posted for a product or a service to the total number of posted messages for the product or service concerned. In addition, as shown in FIG. 6, if, for one example of success indexes, the ratio concerned for a product or a service is equal to or higher than a predetermined value (50%, for example), Success may be indicated for the product or service concerned. In the example shown in FIG. 6, AAA game and CCC game are indicated to be Success. In this case, the posting data that includes the name of a product or a service as a value of message data may be handled as a message posted for this product or service, for example. This setup allows the evaluation of the degree of success based on the ratio of the number of VOC messages to the total number of posted messages to be executed across a plurality of products and services.

As described above, the posting analysis system 10 related with the present embodiment allows the search and analysis of messages posted to the SNS systems 12. The following further describes the functions of the posting analysis system 10 related with the present embodiment and the processing that is executed by the posting analysis system 10 with focus placed on the search and analysis of messages.

Figure 7:
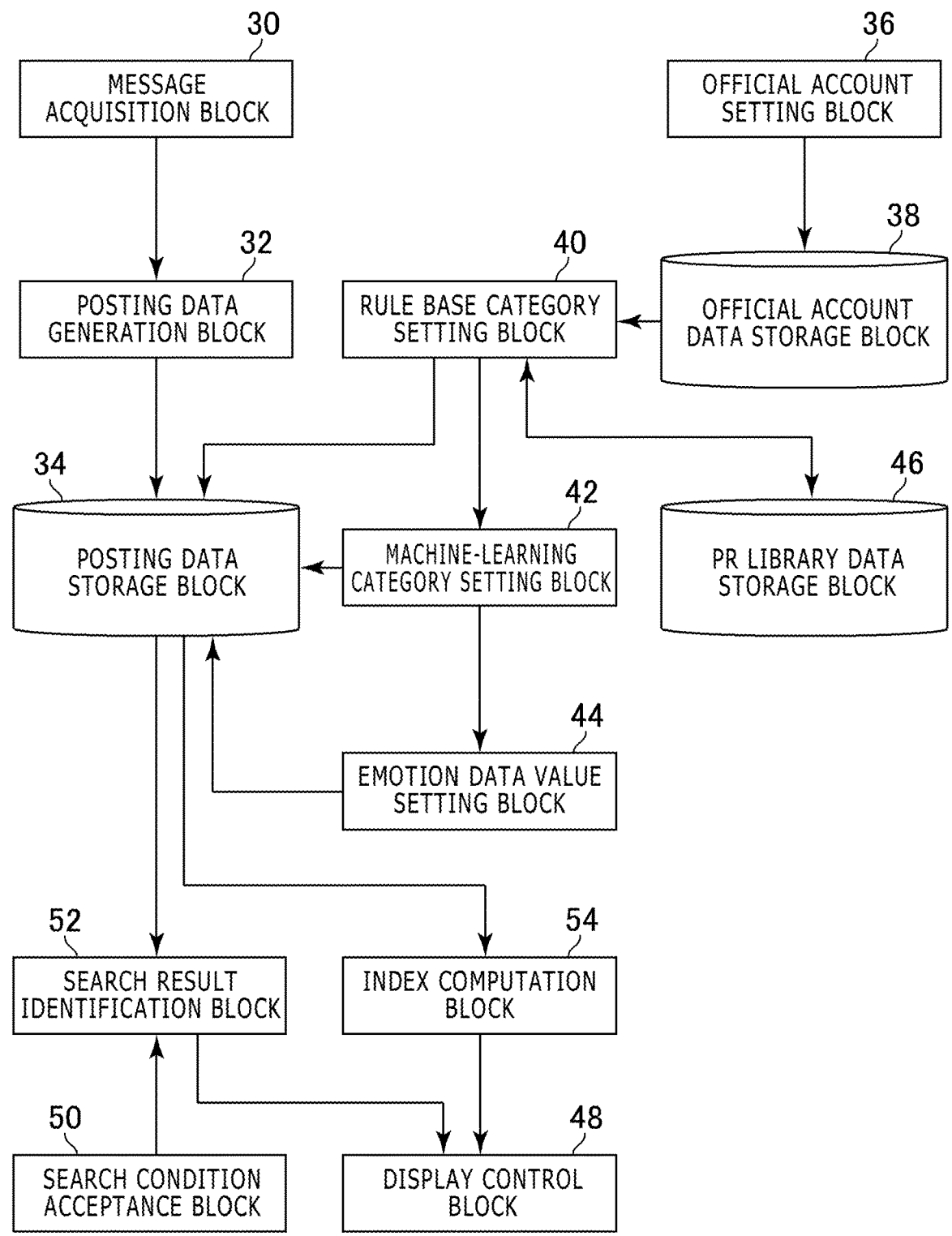
FIG. 7 is a functional block diagram illustrating one example of functions that are implemented on a posting analysis system according to one embodiment of the present disclosure.

Referring to FIG. 7, there is shown a functional block diagram illustrating one example of functions that are implemented on the posting analysis system 10 related with the present embodiment. It should be noted that all the functions shown in FIG. 7 need not be implemented or a function other than those shown in FIG. 7 may be implemented on the posting analysis system 10 related with the present embodiment.

As shown in FIG. 7, the posting analysis system 10 related with the present embodiment functionally has a message acquisition block 30, a posting data generation block 32, a posting data storage block 34, an official account setting block 36, an official account data storage block 36, a rule base category setting block 40, a machine-learning category setting block 42, an emotion data value setting block 44, a PR library data storage block 46, a display control block 48, a search condition acceptance block 50, a search result identification block 52, and an index computation block 54, for example.

The message acquisition block 30 is implemented mainly as the communication block 10*c*. The posting data generation block 32, the rule base category setting block 40, the machine-learning category setting block 42, the emotion data value setting block 44, the search result identification block 52, and the index computation block 54 are implemented mainly as the processor 10*a*. The posting data storage block 34, the official account data storage block 38, and the PR library data storage block 46 are implemented mainly as the storage block 10*b*. The display control block 48 is implemented mainly as the processor 10*a* and the output block 10*d*. The official account setting block 36 and the search condition acceptance block 50 are implemented mainly as the processor 10*a* and the input block 10*e*.

The functions mentioned above may be implemented by executing, by the processor 10*a*, a program installed on the posting analysis system 10 as a computer, the program having commands corresponding to these functions. This program may be supplied to the posting analysis system 10 through a computer-readable information storage medium such as an optical disk, a magnetic disk, a magnetic tape, a magneto-optical disk, or a flash memory or through the Internet, for example.

In the present embodiment, the message acquisition block 30 acquires, from each of the SNS systems 12, data of messages posted to the SNS system 13 concerned, for example.

In the present embodiment, on the basis of the messages acquired by the message acquisition block 30, the posting data generation block 32 generates posting data with a category data value and an emotion data value not set as illustrated in FIG. 2A and stores the generated posting data into the posting data storage block 34, for example.

In the present embodiment, the posting data storage block 34 stores posting data, for example.

In the present embodiment, the official account setting block 36 sets an official account value for use in identification of posting data to which Category PR is set, for example. In the present embodiment, PR is set as a category data value of posting data that includes any of official account values as the value of the posting person data.

Figure 8:
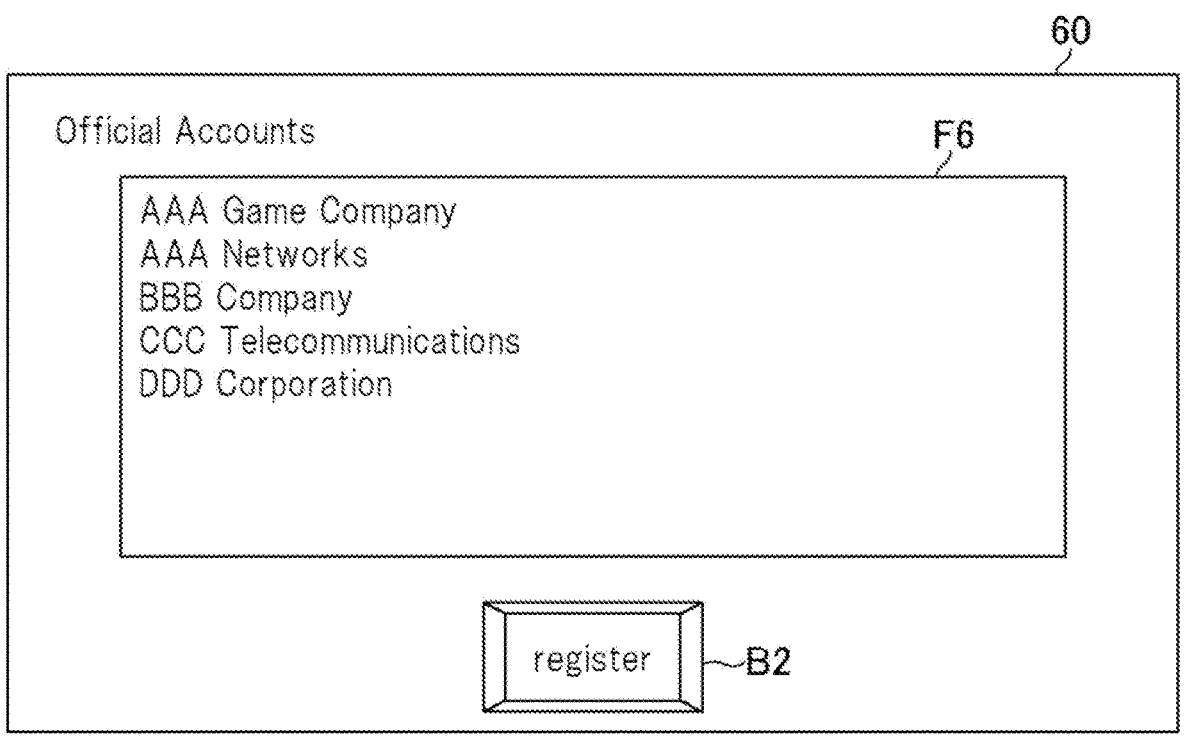
FIG. 8 is a diagram illustrating one example of an official account setting screen.

In the present embodiment, the user is able to set one or more official account values through an official account setting screen 60 illustrated in FIG. 8, for example. Through the official account setting screen 60 illustrated in FIG. 8, the user is able to set one or more official account values to a form F6. When the user clicks a register button B2, the official account setting block 36 generates official account data related with one or more values that are set and stores the generated official account data into the official account data storage block 38. The official account data generated here includes values of related official accounts.

In the present embodiment, the official account data storage block 38 stores official account data that includes official account values, for example.

In the present embodiment, the PR library data storage block 46 stores PR library data that is used for identifying posting data to which Category PR is set, for example. The PR library data is related with message data. For a value of PR library data, a character string indicated by message data included in the posting data to which PR is set as a category data value is set.

In the present embodiment, the rule base category setting block 40 extracts some of posted messages on the basis of predetermined rules with respect to message posting person, reply destination, or contents, for example. Here, the rule base category setting block 40 may extract messages other than the messages determined not the opinions of posting persons on the basis of the predetermined rules with respect to message posting person, reply destination, or contents, for example. To be more specific, the messages determined not the opinions of posting persons may be excluded. In the present embodiment, the rule base category setting block 40 sets Category PR, Q&A, or ISU as the value of the category data of the posting data related with the excluded messages.

In the present embodiment, the machine-learning category setting block 42 sorts, through a machine-learning sorting device, the messages extracted by the rule base category setting block 40, for example. The machine-learning category setting block 42 sorts, through the machine-learning sorting device, the remaining messages to which no category is set by the rule base category setting block 40 into the messages of posting person opinions and other messages, for example. The machine-learning category setting block 42 identifies posting data to which no value of PR, Q&A, or ISU is set as a category data value, for example. Then, by use of a known machine-learning sorting device, the machine-learning category setting block 42 sorts these pieces of posting data into the posting data to which Category Garbage is to be set and the posting data to which Category VOC is to be set. Next, the machine-learning category setting block 42 sets Garbage as the value of the category data of the posting data to which Category Garbage is to be set. In addition, the machine-learning category setting block 42 sets VOC as the value of the category data of the posting data to which Category VOC is to be set.

In the present embodiment, the emotion data value setting block 44 sets a value of emotion data included in posting data by use of a known natural-language processing technology, for example. The emotion data value setting block 44 may set a value of emotion data only with the posting data to which VOC is set as a value of category data.

The display control block 48 generates various screens such as the search screen 20 shown in FIG. 3, the search result screen 22 shown in FIG. 4, the analysis result screen 26 shown in FIG. 5, the success index display screen 28 shown in FIG. 6, and the official account setting screen 60 shown in FIG. 8 and displays the generated screens on the display. For example, on the basis of the posting data stored in the posting data storage block 34, the display control block 48 may generate the analysis result screen 26 shown in FIG. 5 and display the generated screen on the display.

In the present embodiment, the search condition acceptance block 50 accepts search conditions of posting data that are set by the user, for example.

In the present embodiment, the search result identification block 52 identifies posting data that satisfies the search conditions accepted by the search condition acceptance block 50, for example. Here, the display control block 48 may generate the search result screen 22 shown in FIG. 4 on the basis of the posting data identified by the search result identification block 52 and display the generated screen on the display.

In the present embodiment, the index computation block 54 computes such an index related with posting data as a success index mentioned above, for example. The index computation block 54 may compute a success index on the basis of all the posting data stored in the posting data storage block 34, for example. In addition, the index computation block 54 may compute a success index on the basis of the posting data that satisfies user-specified conditions, for example. Further, the index computation block 54 may compute a success index for each product or service, for example. To be more specific, the index computation block 54 may identify posting data that includes the name of a product or a service as the value of message data, for example. Then, the index computation block 54 may compute the ratio of the number of pieces of posting data having Category VOC to the total number of pieces of the identified posting data as a success index indicative of the degree of success of the product or service concerned. Here, the display control block 48 may generate the success index display screen 28 illustrated in FIG. 6 on the basis of the success index computed by the index computation block 54 and display the generated screen on the display.

Figure 9B:
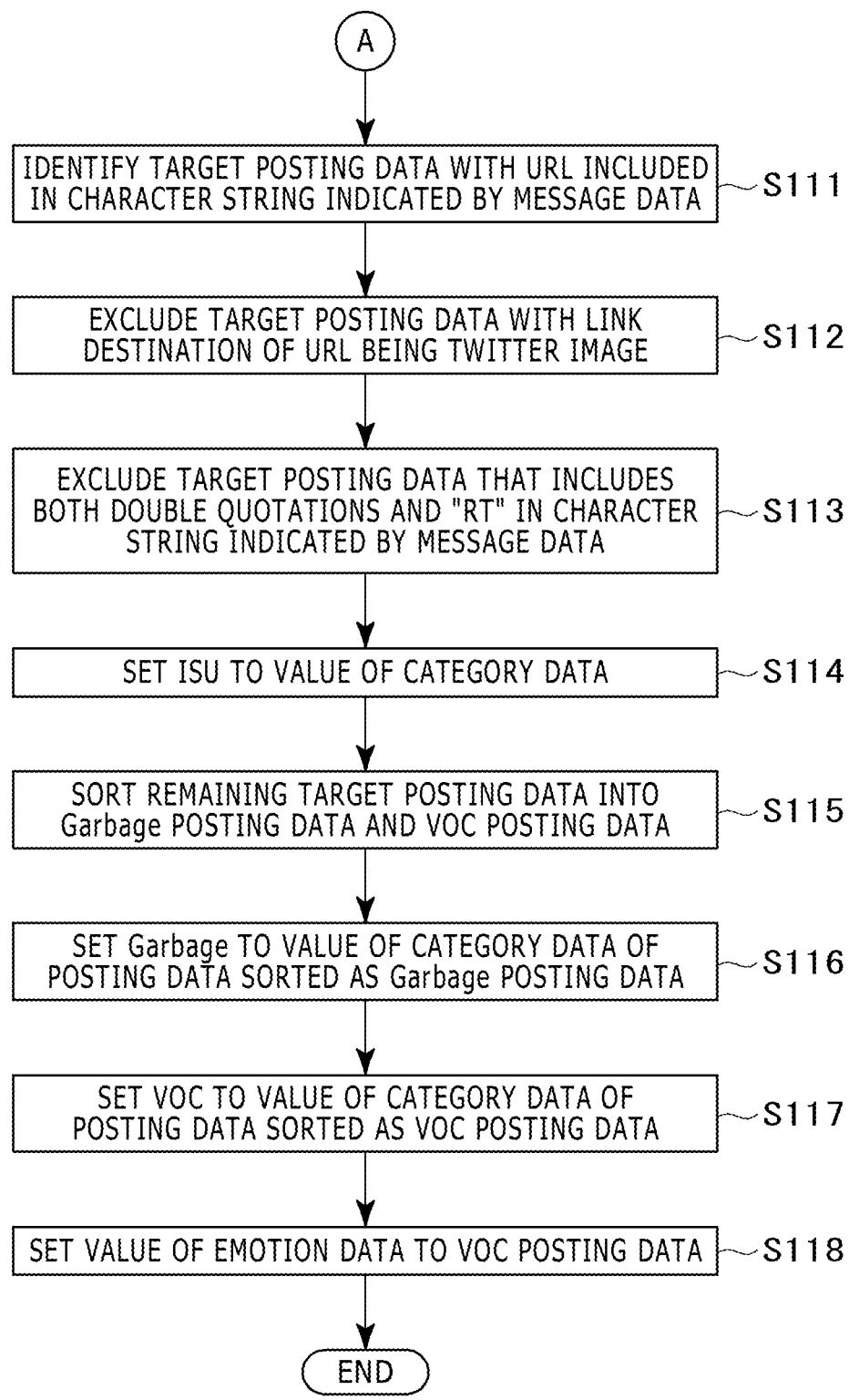
FIG. 9B is a flowchart indicative of one example of a flow of processing that is executed in the posting analysis system.

The following describes one example of a flow of the processing of setting category data values and emotion data values that is executed by the posting analysis system 10 related with the present embodiment, with reference to the flowcharts illustrated in FIG. 9A and FIG. 9B.

First, from the posting data stored in the posting data storage block 34, the rule base category setting block 40 identifies posting data to which a category data value is to be set (S101). Here, the posting data to which a category data value is not set may be identified, for example. In what follows, the posting data identified by the processing shown in S101 is referred to as target posting data.

Next, of the target posting data, the rule base category setting block 40 identifies target posting data with the account name of a posting person being an official account and that is not a reply message (S102). Here, the posting data with the value of posting person data matching the value of any official account and the value of message data including no "@" may be identified, for example. It is considered that the posting data identified here is highly likely to be posting data of a message indicative of an advertisement.

Then, the rule base category setting block 40 sets PR to the value of category data of the posting data identified by the processing shown in S102 (S103).

Next, the rule base category setting block 40 generates PR library data that includes as a value a character string indicated by the message data included in the posting data identified by the processing shown in S102 and stores the generated data into the PR library data storage block 46 (S104).

Then, of the target posting data other than the posting data identified by the processing shown in S102, the rule base category setting block 40 identifies target posting data that retweets the character string that is the value of the PR library data (S105). Here, posting data that includes, as a part or all of the character string indicated by the message data, a combination character string of "RT" and a character string that is the value of any of PR library data may be identified. It is considered that the posting data identified here is also highly likely to be posting data of a message indicative of an advertisement.

Next, the rule base category setting block 40 sets PR to the value of category data of the posting data identified by the processing shown in S105 (S106).

Of the target posting data with the value of category data not set, the rule base category setting block 40 identifies target posting data with the account name of a posting person being an official account (3107). Here, the posting data with the value of posting person data matching the value of any official account may be identified. It is considered that the posting data identified here is highly likely to be posting data of a message indicative of a question or an answer.

Then, the rule base category setting block 40 sets Q&A to the value of category data of the posting data identified by the processing shown in S107 (S108).

Next, of the target posting data with the value of category data not set, the rule base category setting block 40 identifies posting data that is a reply message to an official account (S109). Here, posting data that includes, as a part of the character string indicated by the message data, a combination character string of and the character string that is the value of any official account may be identified, for example. It is considered that the posting data identified here is also highly likely to be posting data of a message indicative of a question or an answer.

Next, the rule base category setting block 40 sets Q&A to the value of category data of the posting data identified by the processing shown in S109 (S110).

Then, of the target posting data with the value of category data not set, the rule base category setting block 40 identifies target posting data that includes a URL in the character string indicated by the message data (S111). The posting data identified here becomes a candidate for posting data of a message snared oy users.

Next, from the posting data identified by the processing shown in S111, the rule base category setting block 40 excludes the posting data with the link destination of the URL included in the character string indicated by the message data being a Twitter image (S112). The posting data excluded here is not likely to be posting data of a message shared by users.

Next, of the posting data identified by the processing shown in S111 and partially excluded by the processing shown in S112, the rule base category setting block 40 excludes the posting data with the character string indicated by the message data including both double quotations and "RT" (S113). The posting data excluded here is also not likely to be posting data of a message shared by users.

Next, the rule base category setting block 40 sets ISO to the value of category data of the posting data identified by the processing shown in S111 and partially excluded by the processing shown in S112 and S113 (S114), Next, the machine-learning category setting block 42 sorts the remaining target posting data into Garbage posting data and VOC posting data by a machine-learning sorting device of a binary-sort machine-learning model learned in advance (S115). In the processing shown in S115, the target posting data with the value of category data not set after the processing shown in S114 is sorted into Garbage posting data and VOC posting data.

Next, the machine-learning category setting block 42 sets Garbage to the value of category data of the posting data sorted as Garbage posting data by the processing shown in S115 (S116).

Then, the machine-learning category setting block 42 sets VOC to the value of category data of the posting data sorted as VOC posting data by the processing shown in S115 (S117).

Then, the emotion data value setting block 44 sets the value of emotion data of the posting data with VOC set as the value of category data by the processing shown in S117 (S118).

It should be noted that the processing of setting the values of category data and emotion data is not limited to the processing shown in the above-mentioned processing examples.

For example, the rule base category setting block 40 may set Q&A as the value of category data of the posting data of a reply message to data registered as the account of a customer service in advance. In addition, the rule base category setting block 40 may set Q&A as the value of category data of the posting data of a reply message that includes the account name of a customer service as the value of posting person data, for example. Further, Q&A may be set as the value of category data of the posting data that is a retweet of such posting data.

Also, the rule base category setting block 40 may set ISU as the value of category data of the posting data that includes a short URL in the character string indicated by the message data, for example. In addition, the rule base category setting block 40 may set ISU as the value of category data of the posting data that is a retweet of the posting data including a short URL in the character string indicated by the message data, for example.

As described above, in the posting analysis system 10 related with the present embodiment, some of the posted messages are excluded in advance on the basis of the rules with respect to message posting person, reply destination, or contents. Then, the remaining messages other than the excluded messages are sorted by a machine-learning sorting device into the messages of posting person opinions and the other messages. Hence, in the posting analysis system 10 related with the present embodiment, the messages indicative of posting person opinions are correctly sorted from the posted messages.

While preferred embodiment of the present disclosure has been described using specific terms, such description is for illustrative purpose only, and it is to be understood by those skilled in the art that changes and variations may be made without departing from the spirit or scope of the following claims.

It should be noted that the above-mentioned specific character strings and numerals and the specific character strings and numerals in the drawings are for illustrative purpose only and therefore not limited thereto.

The present disclosure contains subject matter related to that disclosed in Japanese Priority Patent Application JP 2016-167781 filed in the Japan Patent Office on Aug. 30, 2016, the entire content of which is hereby incorporated by reference.

What is claimed is:

1. A message sorting system comprising:
   a processor;
   a memory;
   wherein the processor, using instructions in the memory, is configured to:
      extract some of a plurality of posted messages on the basis of a rule with respect to message posting person, reply destination, or contents;
      wherein the plurality of posted messages are related with a product or a service;

sort the extracted messages through a machine-learning sorting device,
  wherein the extracted messages are sorted into categories including Voice of Customer, Questions and Answers, Public Relations, information shared by User, and Garbage;
display a ratio of the number of the Voice of Customer messages to a total number of posted messages;
extract messages from only the Voice of Customer category on the basis of a rule with respect to message posting person, reply destination, or contents;
sort the remaining messages into Voice of Customer messages and other messages through the machine-learning sorting device;
determine a success index indicative of a degree of success of the product or service by comparing a ratio of the Voice of Customer messages for the product or service to a total number of posted messages for the product or service and a predetermined threshold value; and
display the index.

2. The message sorting system according to claim 1, wherein
  the processor is further configured to set an emotion data value for the extracted messages sorted into the Voice of Customer category.

3. The message sorting system according to claim 2, wherein the system displays the percentage of each category of extracted messages for the product or service compared to the total number of messages for the product or service; and
  wherein the displayed percentage of Voice of Customer messages also includes the emotion data value.

4. The message sorting system according to claim 1, wherein the processor is further configured to execute a search of the posted messages.

5. The message sorting system according to claim 4, wherein the search conditions include character strings, category, emotion, source, post date, and time range.

6. The message sorting system according to claim 1, wherein the system determines a success index indicative of a degree of success for at least two of the products or services; and
  displays the success index indicative of a degree of success for the at least two of the products or services.

7. The message sorting system according to claim 6, wherein the system displays the percentage of each category of extracted messages for each of the products or services compared to the total number of messages for each of the products or services.

8. The message sorting system according to claim 1, wherein the system displays the percentage of each category of extracted messages for the product or service compared to the total number of messages for the product or service.

9. A message sorting method comprising:
extracting some of a plurality of posted messages on the basis of a rule with respect to message posting person, reply destination, or contents;
  wherein the plurality of posted messages are related with a product or a service;
sorting the extracted messages through a machine-learning sorting device,
  wherein the extracted messages are sorted into categories including Voice of Customer, Questions and Answers, Public Relations, information shared by User, and Garbage;
displaying a ratio of the number of the Voice of Customer messages to a total number of posted messages; and
extracting messages from only the Voice of Customer category on the basis of a rule with respect to message posting person, reply destination, or contents; and
sorting the remaining messages into Voice of Customer messages and other messages through the machine-learning sorting device;
determine a success index indicative of a degree of success of the product or service by comparing a ratio of the Voice of Customer messages for the product or service to a total number of posted messages for the product or service and a predetermined threshold value; and
displaying the index.

10. A non-transitory computer readable information storage medium having a program for causing a computer to:
extract some of a plurality of posted messages on the basis of a rule with respect to message posting person, reply destination, or contents;
  wherein the plurality of posted messages are related with a product or a service;
sort the extracted messages through a machine-learning sorting device,
  wherein the extracted messages are sorted into categories including Voice of Customer, Questions and Answers, Public Relations, information shared by User, and Garbage;
display a ratio of the number of the Voice of Customer messages to a total number of posted messages; and
extract messages from only the Voice of Customer category on the basis of a rule with respect to message posting person, reply destination, or contents; and
sort the remaining messages into Voice of Customer messages and other messages through the machine-learning sorting device;
determine a success index indicative of a degree of success of the product or service by comparing a ratio of the Voice of Customer messages for the product or service to a total number of posted messages for the product or service and a predetermined number; and
display the index.

* * * * *